United States Patent
Ruggeri et al.

(10) Patent No.: US 8,887,482 B1
(45) Date of Patent: Nov. 18, 2014

(54) ACTIVE FLOW CONTROL WITH PULSE DETONATION ACTUATORS

(75) Inventors: Robert T. Ruggeri, Kirkland, WA (US); Ephraim Gutmark, Cincinnati, OH (US)

(73) Assignee: The Boeing Company, Chicago, IL (US)

(*) Notice: Subject to any disclaimer, the term of this patent is extended or adjusted under 35 U.S.C. 154(b) by 1180 days.

(21) Appl. No.: 12/704,675

(22) Filed: Feb. 12, 2010

(51) Int. Cl.
*F02K 7/02* (2006.01)
*F02C 5/00* (2006.01)

(52) U.S. Cl.
USPC ................. 60/39.76; 60/39.38; 431/1

(58) Field of Classification Search
USPC ............ 60/39.38, 39.76, 247; 431/1
See application file for complete search history.

(56) References Cited

U.S. PATENT DOCUMENTS

| 6,112,512 | A  | * | 9/2000  | Miller et al. ................. 60/204 |
| 6,629,674 | B1 |   | 10/2003 | Saddoughi et al. |
| 6,668,542 | B2 |   | 12/2003 | Baker et al. |
| 6,758,032 | B2 | * | 7/2004  | Hunter et al. ................. 60/231 |
| 6,869,049 | B2 |   | 3/2005  | Saddoughi et al. |
| 7,198,234 | B2 | * | 4/2007  | Saddoughi ................. 244/207 |
| 2006/0016170 | A1 | * | 1/2006 | Henry .......................... 60/204 |
| 2006/0022092 | A1 | * | 2/2006 | Miller et al. ............. 244/200.1 |
| 2006/0102800 | A1 | * | 5/2006 | Saddoughi ................. 244/207 |
| 2006/0131282 | A1 | * | 6/2006 | Miller et al. ............. 219/121.5 |
| 2006/0254254 | A1 |   | 11/2006 | Saddoughi et al. |
| 2007/0119827 | A1 | * | 5/2007 | Miller et al. ............ 219/121.51 |
| 2007/0151254 | A1 | * | 7/2007 | Gupta et al. .................. 60/776 |

\* cited by examiner

*Primary Examiner* — Gerald L Sung
*Assistant Examiner* — Scott Walthour
(74) *Attorney, Agent, or Firm* — Lee & Hayes, PLLC

(57) ABSTRACT

Concepts and technologies described herein provide for the creation of a high speed actuating fluid flow utilizing one or more pulse detonation actuators. According to one aspect of the disclosure provided herein, an actuating flow trigger is detected with respect to a high speed airflow over an aerodynamic surface. In response, a pulse detonation actuator is activated and a resulting high speed actuating flow is directed into the high speed airflow to alter at least one attribute of the high speed airflow.

5 Claims, 5 Drawing Sheets

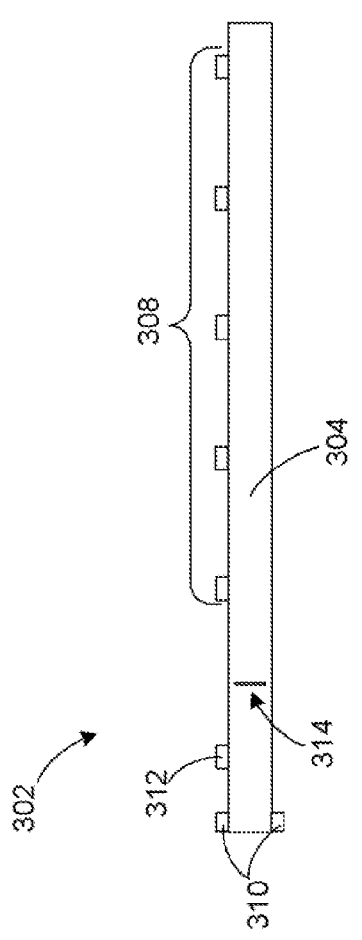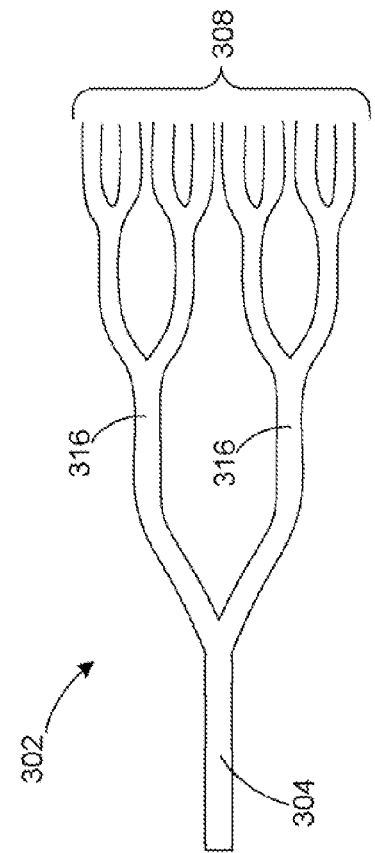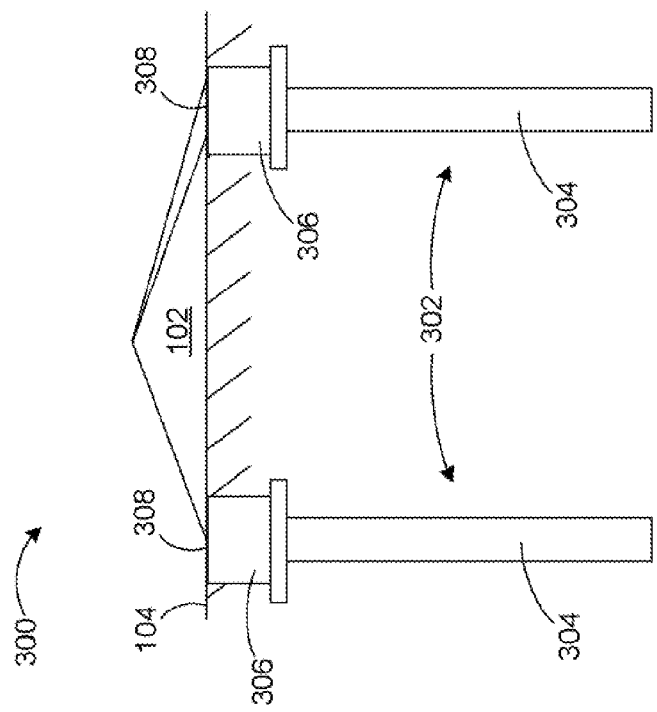
Fig. 3B
Fig. 3C
Fig. 3A

ACTIVE FLOW CONTROL WITH PULSE DETONATION ACTUATORS

BACKGROUND

Various flow control techniques are often utilized to control the flow characteristics of an airstream or other fluid flow over a surface. For example, airflow over an airfoil can be manipulated using flow control techniques to alter the separation location of the flow on the airfoil and to reduce drag. There are numerous types of existing flow control techniques used to control some characteristic of an airflow. For example, static techniques include bumps and projections placed on a surface to strategically disrupt or guide an airflow over the surface. Active flow control techniques include changing a shape of an airfoil, electronically altering the skin friction of a surface, and using synthetic jet actuators to pump an actuating airflow into and out of a surface to interact with and alter the ambient airflow.

Active flow control devices that introduce an actuating airflow into the ambient airflow, such as with synthetic jet actuators, can be particularly effective in various low speed environments. However, as the airspeed of the corresponding aircraft increases, and consequently the speed of the ambient airflow to be controlled increases, most synthetic jet actuators are not capable of producing actuating flows of sufficient velocity to affect the ambient airflow in the desired manner.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for one or more pulse detonation actuators that create an actuating flow suitable for controlling high velocity ambient fluid flows. According to one aspect of the disclosure provided herein, a method for actuating a high speed airflow includes detecting a trigger relating to the high speed airflow over an aerodynamic surface. The trigger initiates the activation of a pulse detonation actuator. The pulse detonation actuator directs an actuating flow into the high speed airflow to alter the high speed airflow in a desired manner.

According to another aspect, an active flow control system includes an ignition source, a pulse detonation tube, and an outlet. The pulse detonation tube has a fuel inlet and is connected to the ignition source. Upon ignition of the fuel within the pulse detonation tube, the pulse detonation tube converts a deflagration wave into a detonation wave. The outlet directs the detonation wave into an ambient airflow over the aerodynamic surface.

According to yet another aspect of the disclosure, an active flow control system includes an aerodynamic surface, at least one sensor associated with the aerodynamic surface to measure an aspect of the high speed airflow, a pulse detonation actuator that operates to direct an actuating flow through an outlet, and a pulse detonation controller linked to the sensor and the pulse detonation actuator. The controller receives a measurement of an attribute of the high speed airflow from the sensor, determines from the measurement that an actuating flow is to be directed into the high speed airflow, and in response, activates the pulse detonation actuator to create the actuating flow.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 3A is a side view representation of an active flow control system utilizing pulse detonation actuators to inject a supersonic actuating flow into a high speed ambient airflow according to various embodiments presented herein;

FIG. 3B is a side view representation of an alternative pulse detonation actuator configuration for providing multiple actuating flow outlets according to various embodiments presented herein;

FIG. 3C is a side view representation of another alternative pulse detonation actuator configuration for providing multiple actuating flow outlets according to various embodiments presented herein;

DETAILED DESCRIPTION

The following detailed description is directed to systems and methods for providing a high speed actuating flow utilizing one or more pulse detonation actuators for controlling a high speed ambient airflow. As discussed above, conventional synthetic jet actuators are not capable of providing actuating flows of sufficient velocity to satisfactorily manipulate high speed airflows.

Utilizing the concepts and technologies described herein, one or more pulse detonation actuators are used to create supersonic actuating flows that are directed into the high speed ambient airflow to control aspects of the airflow. For example, according to various embodiments described below, upon detection of an undesirable shock wave on a surface of an aircraft component, one or more pulse detonation actuators can be activated to direct a supersonic airflow into the ambient airflow upstream of the shock wave, downstream of the shock wave, or upstream and downstream of the high speed ambient airflow. As will become clear from the disclosure below, the pulse detonation actuators provide a lower weight solution to providing flow control authority at high subsonic, transonic, and supersonic flight velocities.

Figure 1:
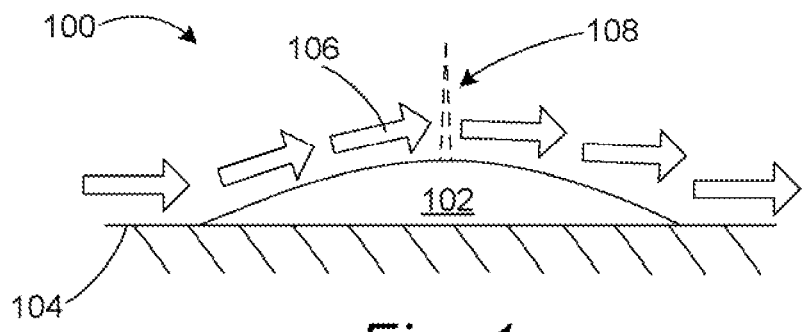
FIG. 1 is a side view representation of a conventional high speed airflow over an aerodynamic surface, illustrating a resultant shock wave on the aerodynamic surface.

In the following detailed description, references are made to the accompanying drawings that form a part hereof, and which are shown by way of illustration, specific embodiments, or examples. Like numerals represent like elements through the several figures. Referring now to FIG. 1, a conventional high speed airflow environment 100 will be described. In a typical scenario, an aerodynamic surface 102 is positioned on an aircraft component 104. In this example, the aerodynamic surface 102 may be a smooth turret located on an outer surface of an aircraft. Throughout this disclosure, the concepts and technologies presented herein may be described in the context of a high speed airflow over a smooth or faceted turret on an outer surface of an aircraft. However, it should be understood that the various embodiments are not limited to implementations that include smooth or faceted turrets. Rather, the concepts described herein are equally applicable to an airflow over any flat or shaped surface, obstruction, or other structure. Similarly, the aircraft component 104 may alternatively be an exterior or interior surface of a spacecraft, rocket, missile, engine, wind tunnel, or any other structure exposed to a high speed ambient airflow 106.

As seen in FIG. 1, a high speed ambient airflow 106 flows over the aerodynamic surface 102, creating a shock wave 108. Depending on the nature of the aerodynamic surface 102 or of adjacent aircraft components, it might not be desirable to have the shock wave 108 exist, or exist in that precise location. Similarly, it can be seen that behind the shock wave 108, there is separation of the ambient airflow 106 from the aerodynamic surface 102, which may be an undesirable attribute of the ambient airflow 106.

Figure 2:
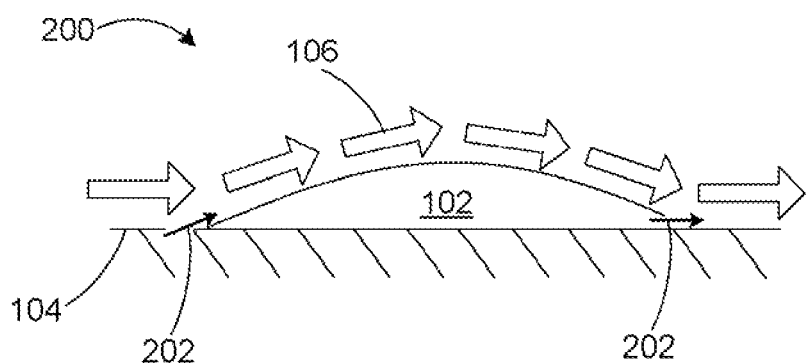
FIG. 2 is a side view representation of the high speed airflow over the aerodynamic surface of FIG. 1, illustrating the effects of actuating flow introduced into the high speed airflow according to various embodiments presented herein.

According to various embodiments of the present disclosure, an actuated airflow environment 200 shown in FIG. 2 utilizes one or more actuating flows 202 injected into the ambient airflow 106 in order to alter or control one or more attributes of the ambient airflow 106, whether caused by a shock wave or not. Referring to the example of the conventional high speed airflow environment 100 discussed above, when the actuating flows 202 are directed into the ambient airflow 106, the shock wave 108 is eliminated, as well as the flow separation. While the arrows representing the actuating flows 202 are shown to be entering the actuated airflow environment 200 at an angle that substantially parallels the downstream surface, it should be appreciated that the actuating flows 202 may be introduced to the ambient airflow 106 at any angle according to the specific implementation and desired effects of the actuating flows 202.

While the shock wave 108 is shown to be eliminated after introduction of the actuating flows 202, according to other embodiments, the actuating flows 202 may be utilized to dampen the shock wave 108 and/or to move the location of the shock wave 108 forward or aft on the aerodynamic surface 102. The precise effects of the actuating flows 202 on the shock wave 108 would depend on the specific characteristics of the aerodynamic surface 102, the ambient airflow 106, the actuating flows 202, and the location and configuration of the outlets through which the actuating flows 202 are introduced into the ambient airflow. While FIG. 2 shows two actuating flows 202, one upstream of the shock wave 108 and one downstream of the shock wave 108, only one actuating flow injected into the ambient airflow 106 at either location or any location along the aerodynamic surface 102 may be utilized without departing from the scope of this disclosure. Similarly, there may be multiple actuating flows 202 injected into the ambient airflow 106 upstream, downstream, and/or at any locations along the aerodynamic surface 102. Moreover, the locations of the one or more outlets for injecting the actuating flows 202 into the ambient airflow 106 may be located farther upstream of the aerodynamic surface 102, at any location on or adjacent to the aerodynamic surface 102, and/or at one or more locations farther downstream of the aerodynamic surface 102 as compared to the locations shown in FIG. 2. As will be described in greater detail below, a phased actuation may be effective in which the downstream actuating flow 202 is initiated a pre-determined amount of time after the upstream actuating flow 202.

FIG. 3A shows an illustrative active flow control system 300. According to this embodiment, an aerodynamic surface 102 in the form of a faceted turret is mounted to an aircraft component 104. As stated above, the disclosure provided herein is not limited to controlling ambient airflow 106 over a turret. Rather, the aerodynamic surface 102 may include any surface feature, to include the aircraft component 104 itself such that the aerodynamic surface 102 is simply a smooth surface with no obstructions projecting into the ambient airflow 106. According to this example, two pulse detonation actuators 302 are mounted forward and aft of the aerodynamic surface 102 in order to provide an actuating flow 202 upstream and downstream, respectively, of the turret. Each pulse detonation actuator 302 includes a pulse detonation tube 304 and a plenum 306. The pulse detonation tube 304 creates a detonation wave through a process described in greater detail below with respect to FIG. 4. The detonation wave exits the pulse detonation tube 304 and enters the plenum 306 at an extremely high velocity. According to various embodiments, the detonation wave travels at or above approximately Mach 6.

If used, the plenum 306 may act to dampen or otherwise configure the detonation wave prior to directing it into the ambient airflow 106 via an outlet 308 through the aircraft component 104. For example, according to one embodiment, the actuating flow 202 may be dampened from over Mach 6 to any velocity less than Mach 6 prior to being exhausted into the ambient airflow 106. According to other embodiments, there may be no plenum 306 included as part of the pulse detonation actuator 302 such that the high velocity detonation wave created within the pulse detonation tube 304 is expelled directly from the pulse detonation tube 304 into the ambient airflow 106 via one or more outlets 308. It should be understood that if included as a component of a pulse detonation actuator 302, a plenum 306 may be any component that is sized and shaped to manipulate the detonation wave created within the pulse detonation tube 304 in a desired manner in order to create an actuating flow 202 having the desired characteristics.

While FIG. 3A illustrates an example in which a single pulse detonation actuator 302 upstream of the aerodynamic surface 102 creates an actuating flow 202 that is injected into the ambient airflow 106 via a single outlet 308, and in which a second pulse detonation actuator 302 downstream of the aerodynamic surface 102 creates an actuating flow 202 that is injected into the ambient airflow 106 via a single outlet 308, it should be understood that a single pulse detonation actuator 302 may be used to provide an actuating flow 202 at multiple locations using multiple outlets 308, or to create an actuating flow 202 along a relatively wide path rather than at a single location within the ambient airflow 106. FIGS. 3B and 3C illustrate examples of two alternative embodiments of a pulse detonation actuator 302 that utilize multiple outlets 308 to provide the desired actuating flow 202.

Looking at FIG. 3B, the pulse detonation actuator 302 includes a pulse detonation tube 304 that does not expel the created detonation wave into a plenum 306. Rather, the end of the pulse detonation tube 304 is sealed such that the high velocity detonation wave created within the pulse detonation tube 304 is expelled into the ambient airflow 106 via a number of outlets 308 that are positioned along the length of the pulse detonation tube 304. As will be discussed in greater detail below with respect to FIG. 4, the pulse detonation actuator 302 may include fuel and oxidizer inlets 310 for receiving the combustible mixture within the pulse detonation tube 304, a spark or other ignition source inlet 312 for exposing an ignition source to the combustible mixture within the tube, and a deflagration-to-detonation transition (DDT) device, such as an orifice, to transition a deflagration wave created from the ignition of the combustible mixture to a high velocity detonation wave.

FIG. 3C shows a simplified depiction of another alternative configuration for a pulse detonation actuator 302 that utilizes multiple outlets 308. According to this example, the end of the pulse detonation tube 304 that is opposite the ignition is configured to branch into two secondary tubes 316. These secondary tubes 316 are further split into additional tubes until the actuating flow 202 is expelled from eight outlets 308. It should be appreciated that the number of secondary tubes 316, as well as the diameter and configuration details, may be determined according to the desired number of outlets 308 and the desired flow characteristics of the actuating flow 202 to be expelled from the outlets 308.

Figure 4:
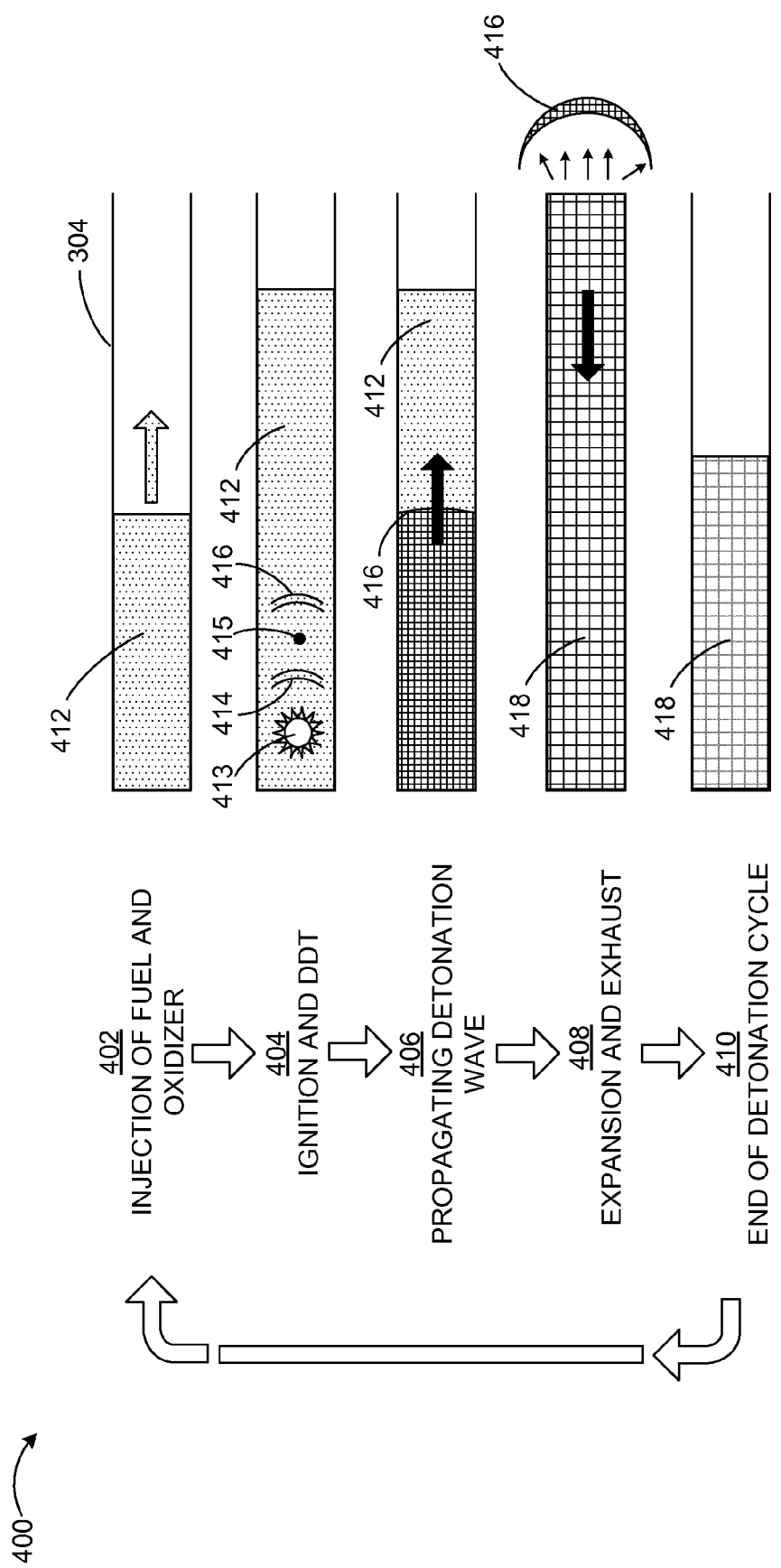
FIG. 4 shows a schematic diagram of a pulsed detonation cycle of a pulse detonation actuator according to various embodiments presented herein.

Turning now to FIG. 4, an illustrative pulsed detonation cycle 400 will be described. One full detonation cycle has been broken down into five events (402, 404, 406, 408, and 410), which are each accompanied by an illustrative portion of a pulse detonation tube 304 that depicts the event occurring within the tube. First, event 402 includes the injection of a fuel and oxidizer. According to one embodiment, the fuel includes ethylene and the oxidizer includes a mixture of 60% oxygen and 40% nitrogen. The fuel and oxidizer may be injected into the pulse detonation tube 304 and mixed through direct jet impingement. It should be understood that the disclosure described herein is not limited to the use of ethylene as a fuel and an oxygen/nitrogen mixture, according to any mixture percentage, as the oxidizer. Rather, any suitable fuels and oxidizers may be used. For example, the fuel may include, but is not limited to, jet fuel, hydrogen, and any other combustible liquid and/or gas. Other oxidizers may include, but are not limited to, air, hydrogen peroxide, ozone, and/or other liquid or gaseous oxidizing agents.

The quantity of fuel and oxidizer injected into the pulse detonation tube 304 may depend on a number of factors, including but not limited to the characteristics of the desired actuating flow 202, the physical configuration of the pulse detonation actuator 302, such as the length and circumference of the pulse detonation tube 304 and corresponding plenum 306, and the type of fuel and oxidizer used. The quantity of fuel and oxidizer can be represented in terms of a fill fraction, which may be defined as the volume of the pulse detonation tube 304 filled with the combustible mixture 412 divided by the overall volume of the tube. The portion of the pulse detonation tube 304 shown with event 402 illustrates the combustible mixture 412 being injected into the tube to fill the tube to the desired fill fraction. Altering the fill fraction of the mixture within the pulse detonation tube 304 may affect the characteristics of the resulting actuating flow 202.

The fuel and oxidizer mixture may also be represented in terms of an equivalence ratio, which is the ratio between fuel and oxidizer. The equivalence ratio of the mixture shows how the ratio of the mixture compares to the stoichiometric oxidizer-to-fuel ratio, or that ratio that would cause complete combustion of all reactants. Thus, an equivalence ratio of 1.0 represents a perfectly stoichiometric mixture. By adding more fuel to the mixture, the equivalence ratio increases, and the mixture is said to be fuel rich. Reducing the amount of fuel in the mixture, or likewise adding more oxidizer to the mixture, drops the equivalence ratio below 1.0, and the mixture is then said to be fuel lean. Altering the equivalence ratio of the mixture within the pulse detonation tube 304 may affect the characteristics of the resulting actuating flow 202.

Once the desired fill fraction and equivalence ratio is achieved, then at event 404, a spark 413 from an ignition source ignites the combustible mixture 412 and a deflagration wave 414 begins to propagate towards the aerodynamic surface 102. Once the deflagration wave 414 reaches an orifice 415 or other DDT device, then the flow transitions into a detonation wave 416. The orifice 415 may be positioned a few diameters from the closed end of the pulse detonation tube 304. The detonation process produces the extremely high velocities associated with detonation waves 416. After the DDT, at event 406, the combustion front of the detonation wave 416 propagates toward the plenum 306 at speeds over Mach 6.

At event 408, the detonation wave 416 is expelled from the pulse detonation tube 304 into the plenum 306 (not shown in FIG. 4), where it is dampened and directed through an outlet into the ambient airflow 106, leaving combustion products 418 behind. The detonation cycle 400 ends at event 410, where the combustion products 418 dissipate as the next cycle 400 begins. The detonation cycle 400 may be repeated any number of times at any frequency to create the pulsed actuating flow 202.

It should be appreciated that the pulse detonation actuators 302 may be sized and otherwise configured according to the specific design criteria associated with the target implementation. As an illustrative example, according to one embodiment, a pulse detonation actuator 302 includes a pulse detonation tube 304 having a circular cross section of approximately 1 inch in diameter. The tube is closed at one end and exhausts into a plenum 306 that is approximately 3 inches in length with a 3.5 inch diameter circular cross section. The pulse detonation actuator 302 has an overall internal length of approximately 25 inches. Through conventional electromagnetic valves, ethylene and a mixture of 60% oxygen and 40% nitrogen are injected into the pulse detonation tube 304 and mixed until a fill fraction of 0.77. After ignition, the deflagration wave 414 encounters a 0.625 inch orifice 415, which transitions the deflagration wave 414 into a detonation wave 416 that propagates toward the aerodynamic surface 102 at approximately Mach 6.3. The plenum 306 reduces the speed of the detonation wave 416 to approximately Mach 1.7, which is exhausted through the outlet and into the ambient airflow 106.

Figure 5:
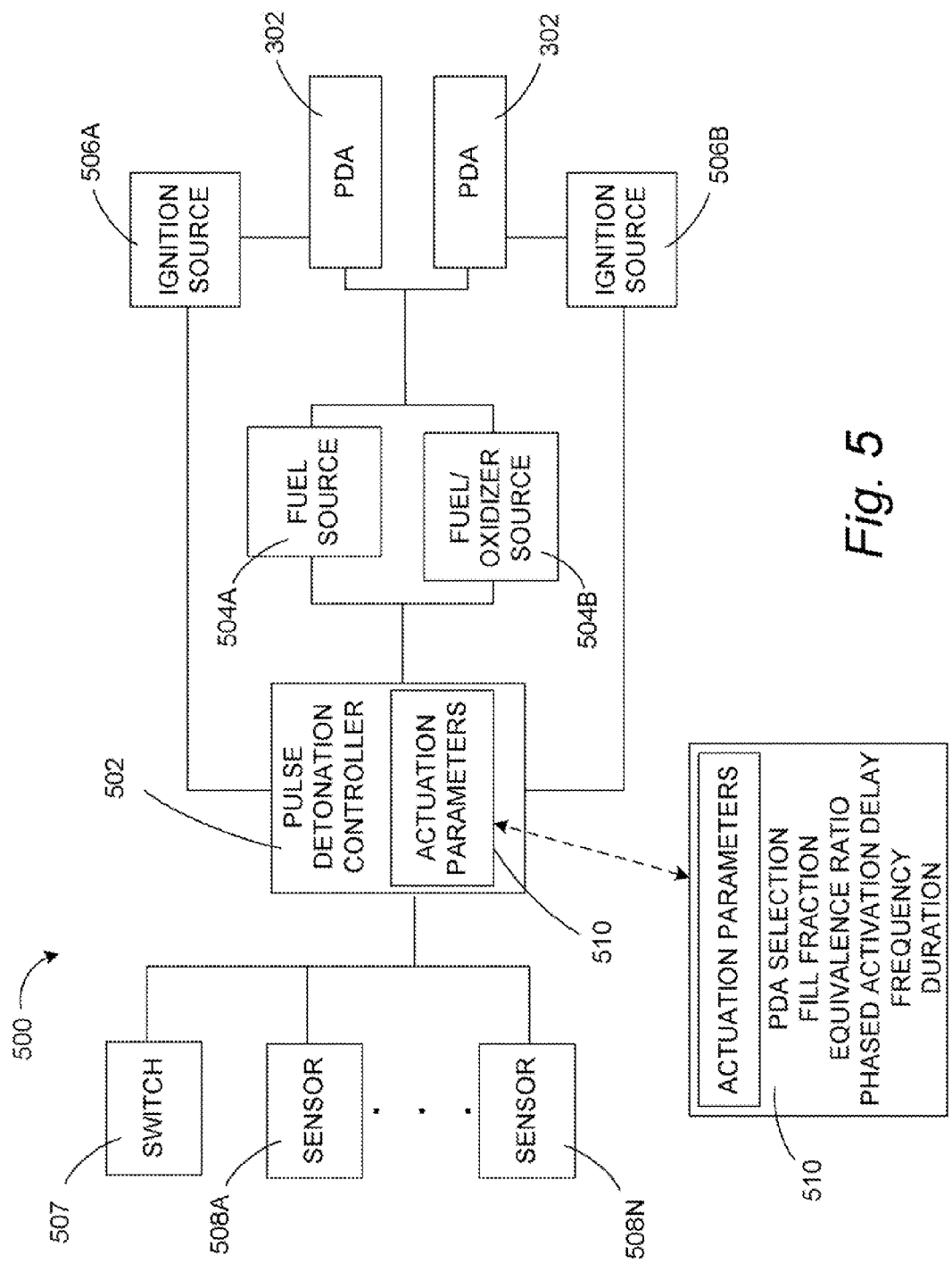
FIG. 5 shows a block diagram representing an active flow control system according to various embodiments presented herein.

Referring now to FIG. 5, an illustrative active flow control system 500 according to various embodiments will be described. The active flow control system 500 includes a pulse detonation controller 502. The pulse detonation controller 502 coordinates the activation of one or more pulse detonation actuators 302 to create the actuating flow 202 for controlling one or more attributes of the ambient airflow 106 over an aerodynamic surface 102. As will be described in further detail below, the pulse detonation controller 502 determines a set of actuation parameters 510 that provide a virtual road map for directing the operation of the active flow control system 500.

The pulse detonation controller 502 is coupled to one or more fuel and oxidizer sources 504. According to one embodiment, ethylene is used as a fuel, mixed with nitrogen and oxygen. The fuel and oxidizer sources 504 would be the tanks and/or bottles used to supply the fuel and oxidizer to the pulse detonation actuators 302. The pulse detonation controller 502 is additionally coupled to one or more ignition sources 506. An ignition source 506 may be a spark plug or other electrical input that is capable of igniting the combustible mixture 412. There may be a single ignition source 506 per pulse detonation actuator 302, or a single ignition source 506 for all pulse detonation actuators 302 in the active flow control system 500.

As mentioned above, to actuate the high speed ambient airflow 106, a single pulse detonation actuator 302 may be used to produce an actuating flow 202 upstream of the undesirable ambient flow attribute (i.e., shock wave 108 or flow separation) or downstream of the undesirable ambient flow attribute. Moreover, as described with respect to FIG. 2 above, two actuating flows 202 may be desirable, with one being injected into the ambient airflow 106 upstream of the aerodynamic surface 102 corresponding to the undesirable ambient flow attribute, and one downstream of the aerodynamic surface 102. To create the dual actuating flows 202, one embodiment may utilize two pulse detonation actuators 302 to create the two actuating flows 202, as shown in FIG. 3 and FIG. 5. Alternatively, a single pulse detonation actuator 302 may be used along with a valve system that switches between directing the resulting detonation wave 416 out of an upstream outlet and a downstream outlet. Also as discussed above, a pulse detonation actuator 302 utilizing multiple outlets 308 may be used to produce the actuating flow 202 as desired.

According to one embodiment, a phased actuation strategy is used in which two pulse detonation actuators 302 are used, one upstream and one downstream of the undesirable ambient flow attribute, with the ignition of the downstream pulse detonation actuator 302 delayed with respect to the ignition of the upstream pulse detonation actuator 302. The timing of the ignitions is controlled by the pulse detonation controller 502. For example, the pulse detonation controller 502 may activate the upstream pulse detonation actuator 302 by initiating the injection of the fuel and oxidizer from the fuel and oxidizer sources 504 until the desired fill fraction is met and then igniting the combustible mixture 412 with the corresponding ignition source 506, and then repeating the process according to the desired actuating frequency. After a pre-determined time delay from the ignition of the upstream pulse detonation actuator 302 (i.e., 4 msec), the combustible mixture 412 within the downstream pulse detonation actuator 302 is ignited with the associated ignition source 506. The pulse detonation controller 502 may then maintain the operation frequency of each pulse detonation actuator 302 to maintain an offset delay in the injection of the separate actuating flows 202 from the upstream and downstream pulse detonation actuators 302.

It should be appreciated that the precise activation delay between pulse detonation actuators 302, the frequency of operation of each actuator, the duration of operation of each actuator, the fill fraction for each actuator, the equivalence ratio for each actuator, and even the choice of utilizing one or more actuators may vary according to the specific implementation. Moreover, these and other actuation parameters 510 of the active flow control system 500 may change during flight in response to changing flight conditions. For example, if the current flight conditions create an undesirable ambient flow attribute such as a shock wave 108 on an aerodynamic surface 102, then the pulse detonation controller 502 may determine that a phased actuation strategy using an upstream pulse detonation actuator 302 and a downstream pulse detonation actuator 302 according to a specific fill fraction corresponding to the desirable velocity of the resultant actuating flow 202 and a specific phased activation delay is desirable.

However, continuing the example, when flight conditions change, the ambient airflow 106 may not induce a shock wave 108, but may separate at an undesirable location on the aerodynamic surface 102. As a result, the pulse detonation controller 502 may determine that a single actuating flow 202 from the upstream pulse detonation actuator 302 is sufficient to satisfactorily alter the flow separation. Accordingly, the pulse detonation controller 502 will activate the upstream pulse detonation actuator 302 according to a determined frequency, duration, and actuating flow velocity.

According to one embodiment, in order to trigger the determination of the proper actuation parameters 510 of the active flow control system 500, the pulse detonation controller 502 determines that an undesirable ambient flow attribute exists. This determination may be made according to any number of flight attributes measured by any number and type of sensors 508A-508N (collectively 508). For example, pressure sensors 508 corresponding to the aerodynamic surface 102 may measure a pressure differential at a specific location that indicates that a shock wave 108 exists at that location, which is an undesirable ambient flow attribute. Because the measured pressure differential exceeds a stored threshold pressure differential corresponding to the sensors 508 at that particular location, the pulse detonation controller 502 utilizes the measured differential as an actuating flow trigger that initiates the determination of the actuation parameters 510 and the subsequent activation of one or more pulse detonation actuators 302 according to the determined actuation parameters 510. Other examples of types of sensors 508 include, but are not limited to, temperature sensors and shear stress sensors.

Alternatively, the pulse detonation controller 502 may respond to a manual actuating flow trigger, such as a switch 507 in the cockpit that a pilot may use to turn the active flow control system 500 on and off manually. Upon receiving the selection of the switch 507, the pulse detonation controller 502 may utilize data from the sensors 508 to optimize the actuation parameters 510 according to current flight attributes. Alternatively, the actuation parameters 510 may be pre-programmed such that activation of the switch 507 results in an actuating flow 202 from a predetermined number or set of pulse detonation actuators 302, with the actuating flow 202 from each having the same velocity, frequency, and duration each time the switch 507 is activated. There may be multiple switches 507 corresponding to multiple pulse detonation actuators 302 located on the same or different aerodynamic surfaces 102 of the aircraft.

It should be appreciated that the pulse detonation controller 502 may be any computer device utilized to execute computer executable instructions stored on a computer storage medium to provide a high speed actuating flow 202 in the manner presented above. The pulse detonation controller 502 may be implemented as a dedicated computer for providing active flow control, or as a program module of a flight computer utilized for one or more other aircraft systems.

Figure 6:
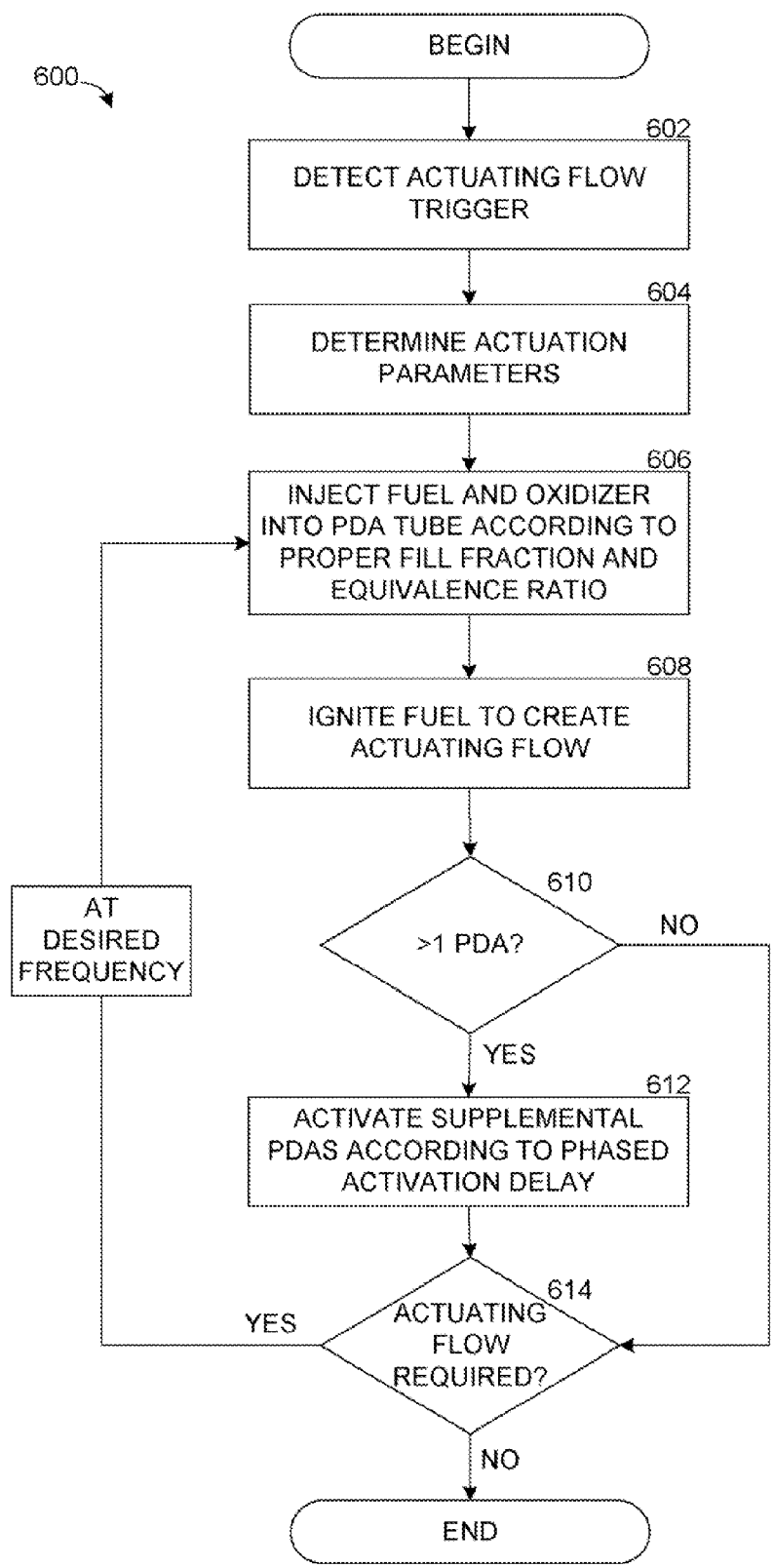
FIG. 6 is a logic flow diagram showing a method for providing a high speed actuating flow according to various embodiments presented herein.

Turning now to FIG. 6, an illustrative routine 600 for providing an actuating flow for controlling an attribute of a high speed airflow will now be described in detail. It should be appreciated that the logical operations described herein with respect to FIG. 6 may be implemented (1) as a sequence of computer implemented acts or program modules running on a computing system and/or (2) as interconnected machine logic circuits or circuit modules within the computing system. The implementation is a matter of choice dependent on the performance and other requirements of a computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where the pulse detonation controller 502 detects an actuating flow trigger. As discussed above, the actuating flow trigger may be the result of real time flight attributes, as measured with the sensors 508, or may alternatively be the receipt of a manual selection of a switch 507. From operation 602, the routine 600 continues to operation 604, where the pulse detonation controller 502 determines the actuation parameters 510. These actuation parameters may include, among others, a selection of the pulse detonation actuators 302 to be used, a fill fraction for each of the pulse detonation actuators 302, a phased activation delay if one is to be utilized, and an operating frequency and duration associated with each pulse detonation actuator 302.

The routine 600 continues from operation 604 to operation 606, where the pulse detonation controller 502 initiates the injection of fuel and oxidizer into the pulse detonation tubes 304 according to the proper fill fraction and equivalence ratio. The type of fuel and oxidizer and the fill fraction will affect the velocity of the detonation wave 416 that exits the plenum 306 as the actuating flow 202. From operation 606, the routine continues to operation 608, where the fuel is ignited using the ignition source 506 in order to create the deflagration wave 414. As described above, when the deflagration wave 414 reaches the orifice 415, DDT occurs and the resulting detonation wave 416 propagates outward to the plenum 306, where it is dampened and output through the outlet as an actuating flow 202.

The routine 600 continues to operation 610, where a determination is made as to whether more than one pulse detonation actuator 302 is to be used. If not, then the routine 600 proceeds to operation 614 and continues as described below. However, if more than one pulse detonation actuator 302 is to be used to actuate the ambient airflow 106, then the routine 600 continues to operation 612, where any supplemental pulse detonation actuators 302 are activated according the phased actuation delay that was determined at operation 604. As discussed above, multiple pulse detonation actuators 302 may be synchronized according to a phased delay, or may be actuated simultaneously.

From operation 612, the routine 600 continues to operation 614, where a determination is made after the initial detonation cycle 400 is complete as to whether additional actuating flow 202 is required. While determining the actuation parameters 510 at operation 604, the total duration for actuating the ambient airflow 106 may have been determined. If that total duration has not yet been achieved, then at operation 614, it is determined that actuating flow 202 is still required. If the total duration has been achieved, then the routine 600 ends.

Alternatively, if the total duration of actuating flow 202 is not an actuation parameter 510 that is pre-determined at operation 604, but rather determined in real time as the sensors 508 provide flight attribute data to the pulse detonation controller 502, then the determination whether or not to continue the actuating flow 202 at operation 614 is determined according to current flight data from the sensors 508. If the pulse detonation controller 502 determines that the undesirable ambient flow attribute no longer exists, then the routine 600 ends. However, if the pulse detonation controller 502 determines that the undesirable ambient flow attribute still exists, then it is determined that additional actuating flow 202 is required and the routine 600 returns to operation 606, where the applicable pulse detonation actuators 302 are again activated according to the desired operating frequency, which may have been determined as an actuation parameter at operation 604. The routine 600 then continues until the pulse detonation controller 502 determines that the actuating flow 202 is no longer required, at which time the routine 600 ends.

It should be appreciated from the above disclosure that the concepts presented herein provide a relatively low weight solution to control undesirable high speed ambient airflow attributes. A single pulse detonation actuator 302 may be used to inject sonic or supersonic actuating flow 202 upstream of the undesirable ambient airflow attribute in order to modify the ambient airflow 106 in a manner that suppresses, moves, or eliminates the undesirable ambient airflow attribute. Similarly, due to the velocity of the actuating flow 202 leaving the pulse detonation actuators 302 described herein, coupled with the characteristics of high speed ambient airflow 106 with which the actuating flow 202 is mixed, utilizing a single pulse detonation actuator 302 to inject sonic or supersonic actuating flow 202 downstream of the undesirable ambient airflow attribute may also affect the ambient airflow 106 upstream of the actuating flow 202 in a manner that suppresses, moves, or eliminates the undesirable ambient airflow attribute.

Further, utilizing a phased actuating strategy in which an upstream pulse detonation actuator 302 and a downstream pulse detonation actuator 302 are synchronized according to an activation delay may be particularly effective in dissipating, relocating, or eliminating the undesirable ambient airflow attribute. For these reasons, any number of pulse detonation actuators 302 may be located upstream and/or downstream of turrets, obstructions, doors, optical lenses, flight control surfaces, cavities such as weapon bay and landing gear cavities, wings, engine inlets and outlets, and any other location on an aircraft to control shock waves, flow separation, wing tip and other aircraft vortices, noise, aircraft signatures, thrust, drag, lift, flight control, and engines under any flight velocities and other conditions.

Based on the foregoing, it should be appreciated that technologies for providing a high speed actuating flow have been disclosed herein. It is to be understood that the invention defined in the appended claims is not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An active flow control system, comprising:
   an ignition source;
   a first pulse detonation tube coupled to the ignition source and comprising a fuel inlet, the first pulse detonation tube configured to create a detonation wave from a deflagration wave after ignition of fuel within the first pulse detonation tube via the ignition source; and
   a first outlet coupled to an aerodynamic surface and configured to direct the detonation wave into an ambient airflow over the aerodynamic surface;
   a second pulse detonation tube having a second outlet coupled to the aerodynamic surface and configured to direct a detonation wave from the second pulse detonation tube into the ambient airflow over the aerodynamic surface; and a pulse detonation controller configured to determine a presence of a shock wave, and in response to determining the presence of the shock wave, coordinating the ignition of the first pulse detonation tube and the second pulse detonation tube such that the shock wave is eliminated or moved forward or aft.

2. The active flow control system of claim 1, further comprising a plenum coupled to each pulse detonation tube, each plenum having an entrance connected to an end of the pulse detonation tube opposite the ignition source and further connected to the outlet coupled to the aerodynamic surface, the plenum configured to alter a velocity of the detonation wave received from the pulse detonation tube before expelling the detonation wave through the outlet.

3. The active flow control system of claim 1, wherein coordinating the ignition of the first pulse detonation tube and the second pulse detonation tube comprises coordinating ignition of the first pulse detonation tube and the second pulse detonation tube according to a pre-determined time delay.

4. The active flow control system of claim 1, wherein each outlet comprises a plurality of outlets such that the detonation wave is directed into the ambient airflow at a plurality of locations associated with the aerodynamic surface.

5. An active flow control system, comprising:
an aerodynamic surface exposed to a high speed airflow and having a first outlet and a second outlet downstream of the first outlet, each outlet providing for fluid flow through the aerodynamic surface and into the high speed airflow;
at least one sensor associated with the aerodynamic surface, the at least one sensor configured to measure an attribute of the high speed airflow;
a first pulse detonation actuator coupled to the first outlet of the aerodynamic surface and configured to direct an actuating flow through the first outlet and into the high speed airflow;
a second pulse detonation actuator coupled to the second outlet and configured to direct an actuating flow through the second outlet and into the high speed airflow; and
a pulse detonation controller communicatively linked to the at least one sensor, to the first pulse detonation actuator, and to the second pulse detonation actuator, and configured to
receive a measurement of the attribute of the high speed airflow from the at least one sensor,
determine an indication of a shock wave from the measurement, the shock wave positioned at a location between the first outlet and the second outlet, and
responsive to the indication of the shock wave, coordinate activation of the first pulse detonation actuator with activation of the second pulse detonation actuator to create the actuating flow.

* * * * *